United States Patent
Na et al.

(10) Patent No.: US 11,701,743 B2
(45) Date of Patent: Jul. 18, 2023

(54) APPARATUS AND METHOD FOR MANUFACTURING HEAT EXCHANGER FOR VEHICLE

(71) Applicants: Hyundai Motor Company, Seoul (KR); Kia Motors Corporation, Seoul (KR)

(72) Inventors: Sung Wook Na, Gyeonggi-do (KR); Hun Woo Park, Gyeonggi-do (KR); Chi Myung Kim, Gyeonggi-do (KR); Il Hwan Kim, Gyeongsangnam-do (KR); Sung Bok Yoo, Gyeongsangnam-do (KR); Soo Hwan Park, Gyeongsangnam-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 1240 days.

(21) Appl. No.: 16/189,803

(22) Filed: Nov. 13, 2018

(65) Prior Publication Data

US 2019/0076971 A1     Mar. 14, 2019

Related U.S. Application Data

(62) Division of application No. 14/507,034, filed on Oct. 6, 2014, now abandoned.

(30) Foreign Application Priority Data

May 2, 2014   (KR) ........................ 10-2014-0053584

(51) Int. Cl.
*B23K 1/00*     (2006.01)
*B23P 15/26*   (2006.01)
(Continued)

(52) U.S. Cl.
CPC .............. *B23P 15/26* (2013.01); *B21D 53/02* (2013.01); *B23K 1/0012* (2013.01); *B23K 3/08* (2013.01);
(Continued)

(58) Field of Classification Search
CPC ....... B23P 15/26; B21D 53/02; B23K 1/0012; B23K 3/08; B23K 3/087; B23K 37/0408;
(Continued)

(56) References Cited

U.S. PATENT DOCUMENTS 1,972,379 A    9/1934  Feldmeier
2,015,819 A   10/1935  Seligman
(Continued)

FOREIGN PATENT DOCUMENTS

JP    62-227573      10/1987
JP    H 05-154974 A   6/1993
(Continued)

OTHER PUBLICATIONS

Machine translation of JP-2008036650A (no date available).*

*Primary Examiner* — Kiley S Stoner
(74) *Attorney, Agent, or Firm* — Fox Rothschild LLP

(57) ABSTRACT

An apparatus for manufacturing a heat exchanger for a vehicle has a plurality of cooling panels bonded to each other by pressing a cooling panel module where the plurality of cooling panels are stacked vertically, including: a fixing portion for supporting top and bottom ends of the cooling panel module; and a pair of elastic portions that are provided between the top or bottom end of the cooling panel module and the fixing portion, and are arranged symmetrically based on a top or bottom surface of the cooling panel module to compress the cooling panel module.

2 Claims, 6 Drawing Sheets

(51) Int. Cl.
    *B23K 37/04* (2006.01)
    *B23K 3/08* (2006.01)
    *F28D 9/00* (2006.01)
    *B21D 53/02* (2006.01)
    *B23K 101/14* (2006.01)

(52) U.S. Cl.
    CPC .......... *B23K 3/087* (2013.01); *B23K 37/0408* (2013.01); *F28D 9/0062* (2013.01); *B23K 2101/14* (2018.08); *F28F 2255/02* (2013.01); *F28F 2275/04* (2013.01); *Y10T 29/49369* (2015.01)

(58) Field of Classification Search
    CPC ............... B23K 2101/14; F28D 9/0062; F28F 2255/02; F28F 2275/04; Y10T 29/49369
    USPC .......................................... 228/159–160, 183
    See application file for complete search history.

(56) References Cited

U.S. PATENT DOCUMENTS

| | | | |
|---|---|---|---|
| 2,582,871 A | 1/1952 | Kintner | |
| 2,677,531 A | 5/1954 | Hock, Sr. | |
| 4,041,591 A * | 8/1977 | Noll | F28F 7/02 428/117 |
| 4,606,960 A | 8/1986 | Angel et al. | |
| 4,721,653 A | 1/1988 | Oda et al. | |
| 5,462,112 A | 10/1995 | Johansson | |
| 6,006,430 A | 12/1999 | Fukuoka et al. | |
| 6,565,942 B2 | 5/2003 | Anderson et al. | |
| 8,372,327 B2 | 2/2013 | Matsen et al. | |
| 8,778,285 B2 | 7/2014 | Hoglund et al. | |
| 8,839,518 B1 * | 9/2014 | Neal | F02M 26/32 29/890.038 |
| 2004/0188060 A1 | 9/2004 | Finch et al. | |
| 2006/0021744 A1 * | 2/2006 | Vogel | F28F 3/12 165/170 |
| 2006/0151155 A1 * | 7/2006 | Nakata | F28F 21/089 165/176 |
| 2009/0178784 A1 * | 7/2009 | Wang | B23P 15/26 165/104.26 |
| 2009/0288814 A1 * | 11/2009 | Stoia | F28F 21/08 165/185 |
| 2012/0152507 A1 * | 6/2012 | Godry | B23K 1/0012 165/173 |
| 2012/0175092 A1 | 7/2012 | Otahal et al. | |
| 2014/0352671 A1 * | 12/2014 | Neal | B23P 6/00 123/568.12 |
| 2015/0168075 A1 | 6/2015 | Bertilsson et al. | |
| 2015/0352649 A1 * | 12/2015 | Bareiss | B23K 31/02 228/159 |
| 2016/0146553 A1 * | 5/2016 | Denoual | F28F 9/0253 165/104.19 |
| 2016/0293352 A1 * | 10/2016 | Zacharias | B21D 39/035 |

FOREIGN PATENT DOCUMENTS

| | | |
|---|---|---|
| JP | 06257974 | 9/1994 |
| JP | 2008-036650 | 2/2008 |
| JP | 2009-052873 A | 3/2009 |
| KR | 10-2001-0004641 | 1/2001 |
| KR | 20-0341115 | 10/2003 |
| KR | 10-2007-0098679 | 10/2007 |
| KR | 10-2008-0084569 A | 9/2008 |
| KR | 10-2010-0069871 | 6/2010 |
| KR | 10-1214869 B1 | 12/2012 |

* cited by examiner

APPARATUS AND METHOD FOR MANUFACTURING HEAT EXCHANGER FOR VEHICLE

CROSS-REFERENCE TO RELATED APPLICATION

The present application is a Divisional Application of U.S. patent application Ser. No. 14/507,034 filed on Oct. 6, 2014 which claims under 35 U.S.C. § 119(a) the benefit of Korean Patent Application No. 10-2014-0053584 filed on May 2, 2014, which is incorporated by reference herein in its entirety.

BACKGROUND

(a) Technical Field

The present invention relates to an apparatus and method for manufacturing a heat exchanger for a vehicle, and more particularly, to an apparatus in which a cooling panel is not to be dented or peeled off even when a vacuum-brazing is performed, and a corresponding method.

(b) Description of the Related Art

Generally, a fuel cell module is mounted in an engine room of a rear end of a vehicle in a fuel cell bus. In particular, when a radiator is arranged in the front of the vehicle, a coolant loop becomes too long and complicated so that an intermediate heat exchanger is provided, unlike a fuel cell system for a passenger vehicle.

The intermediate heat exchanger is manufactured by stacking and welding aluminum panels, and on both ends of the aluminum panels openings through which coolant flows inside are formed and inside of which a flow passage is provided. For example, as shown in FIG. 1 (RELATED ART), each aluminum panel 10 is provided with a flow passage portion 13 inside of which a flow passage is formed, a separation plate 11 covering a top and bottom of the flow passage portion 13, and a frame 12 which surrounds the edge of the flow passage portion 13 wherein the both ends of the aluminum plate 10 are opened to form an inlet and outlet. Further, the aluminum panels 10 are stacked up/downwardly to form an aluminum panel module 20.

Meanwhile, a welding method is used for bonding the flow passage portion 13 to the separation plate 11 or bonding one aluminum panel 10 to another aluminum panel 10, and at this time a brazing is used as the welding method. In particular, according to the related art, a flux has been applied to target materials prior to the brazing process so as to gain a high-quality bonding property wherein the flux is a material to be applied on the target material in a continuous Controlled Atmosphere Brazing (CAB) furnace where high heat is applied to the aluminum panel module 20, and the flux serves to prevent magnesium on a surface of the aluminum panel 10 from being raised up to the surface. If the magnesium is raised up to the surface of the aluminum panel, the bonding property is deteriorated and thus the flux is considered as an important material when bonding the aluminum panel 10.

However, when coolant flows to the inside of each cooling panel after the product on which flux is applied is produced through the continuous furnace, the flux is eluted thereby to easily increase the electrical conductivity of the coolant. Accordingly, the problems of electrical safety for a driver and durability of a filter group occur, leading to deterioration of durability of a fuel cell.

The description provided above as a related art of the present invention is just for helping understanding the background of the present invention and should not be construed as being included in the related art known by those skilled in the art.

SUMMARY

The present invention provides an apparatus for manufacturing a heat exchanger for a vehicle and a corresponding method, which utilizes a vacuum-brazing method. Further, in the apparatus, an elastic body is provided on a top or bottom end of an aluminum panel module in order to apply a uniform load to the aluminum panel module, and a supporting body is provided with openings formed on both ends of aluminum panels.

In one aspect, the present invention may provide an apparatus for manufacturing a heat exchanger for a vehicle and a corresponding method, in which a plurality of cooling panels are bonded to each other by pressing a cooling panel module where the plurality of cooling panels are stacked vertically, including: a fixing portion for supporting top and bottom ends of the cooling panel module; and at least one pair of elastic portions that are provided between the top or bottom end of the cooling panel module and the fixing portion, and are arranged symmetrically based on a top or bottom surface of the cooling panel module to compress the cooling panel module.

The apparatus may further include a diffusion panel provided between the elastic portion and a top or bottom surface of the cooling panel module so as to diffuse load of the elastic portion.

The cooling panel may further include an inlet through which coolant is input and an outlet through which the coolant is discharged, and further comprising a support pin for supporting at least one of the inlet and the outlet so as to prevent the deformation of the inlet and the outlet when the cooling panel module is compressed.

The support pins may be provided on the inlet and the outlet, respectively.

The support pins may have a honeycomb structure.

An aspect of the present invention may also provide a method for manufacturing a heat exchanger for a vehicle, including the steps of: providing a plurality of cooling panels bonded to each other by pressing a cooling panel module where the plurality of cooling panels are stacked vertically, wherein each cooling panel is provided with an inlet through which coolant is input and an outlet through which the coolant is discharged; inserting a support pin into at least one of the inlet and the outlet of the cooling panel; brazing a cooling panel module where the support pin inserted into at least one of the inlet and the outlet of the cooling panel; and cutting the end of at least one of the inlet and the outlet of the cooling panel.

The part to be cut at the cutting step may include the scrap that is formed at the brazing step.

The brazing that is performed at the brazing step may be a vacuum-brazing.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
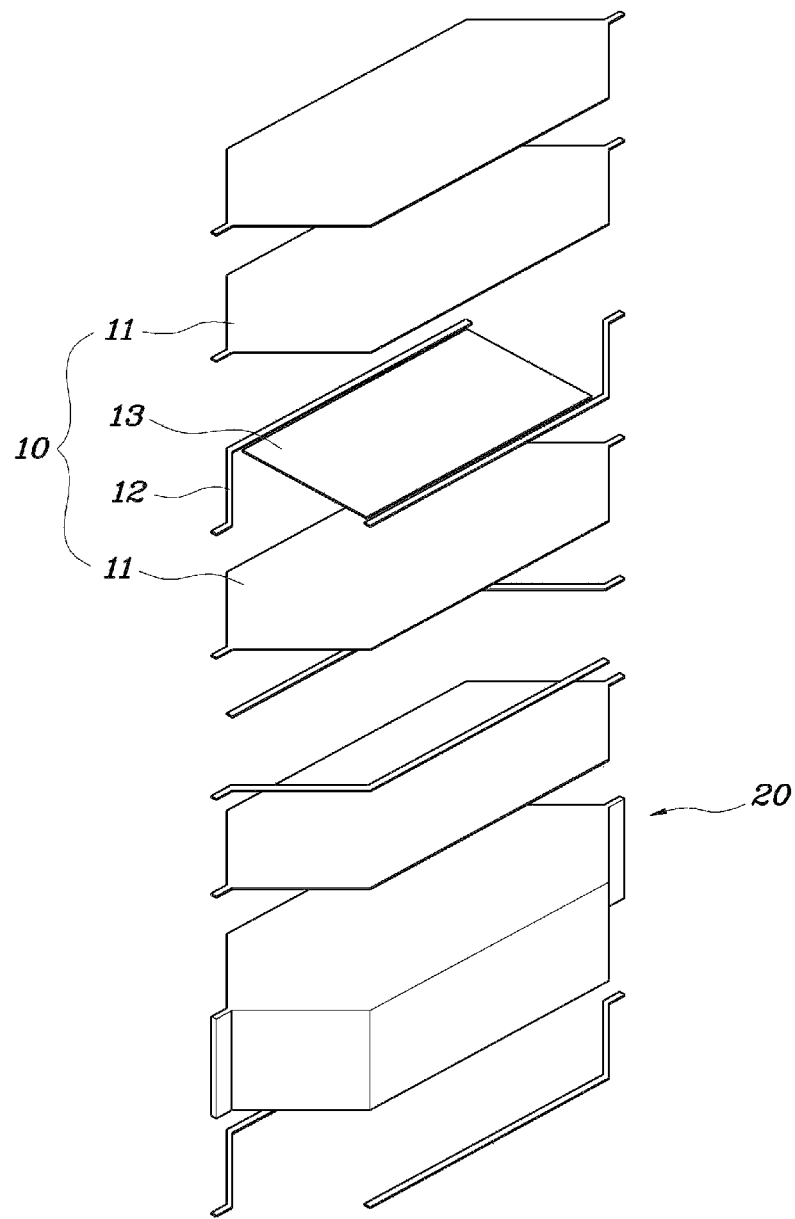
FIG. 1 (RELATED ART) is a perspective view illustrating an aluminum panel module according to a related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover the exemplary embodiments as well as various alternatives, modifications, equivalents and other embodiments; which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of an apparatus for manufacturing a heat exchanger for a vehicle and a corresponding method are described hereafter in detail with reference to the accompanying drawings.

Figure 2A:
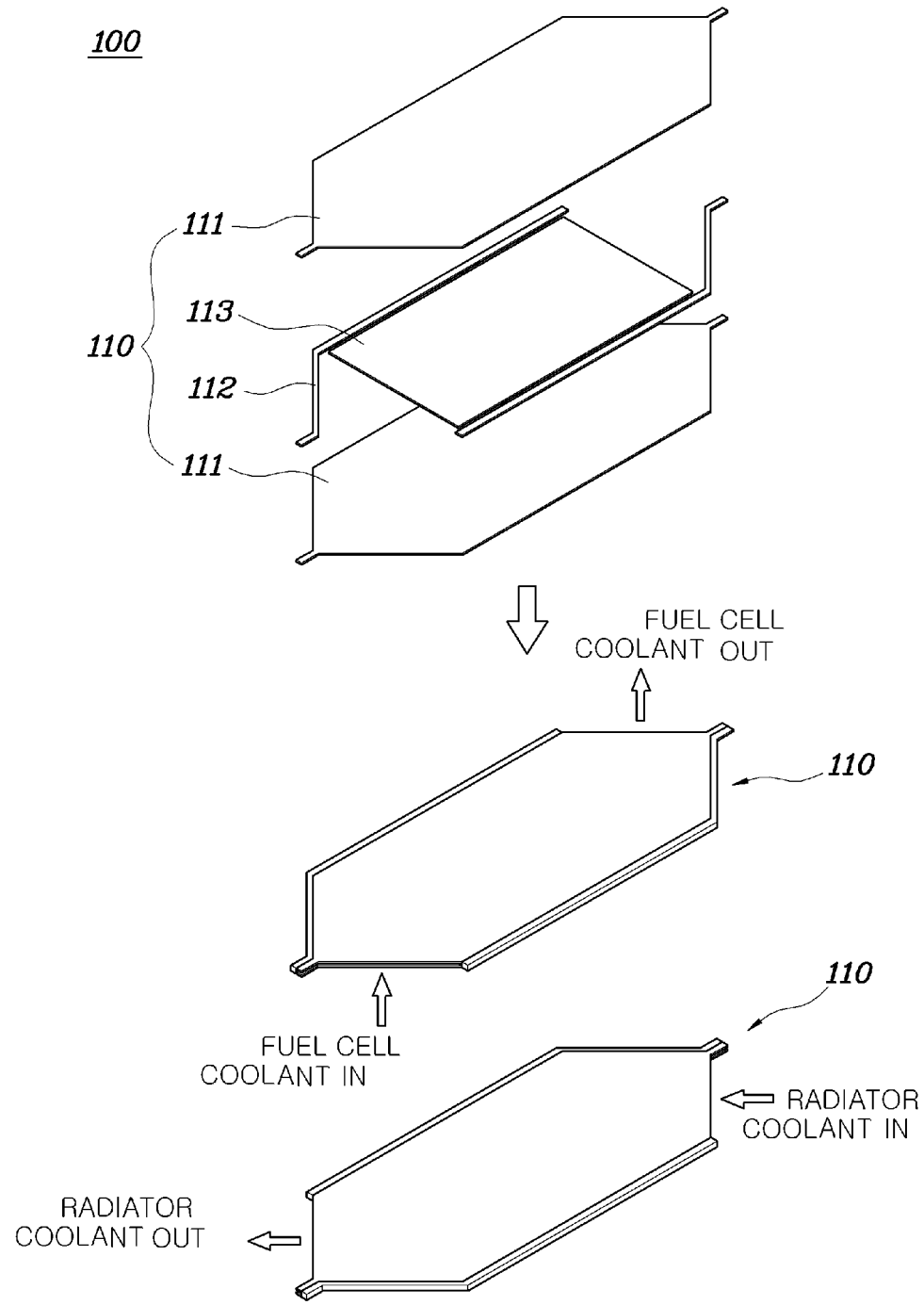
FIG. 2A is a perspective view illustrating a cooling panel module including a plurality of cooling panels according to an embodiment of the present invention.
Figure 2B:
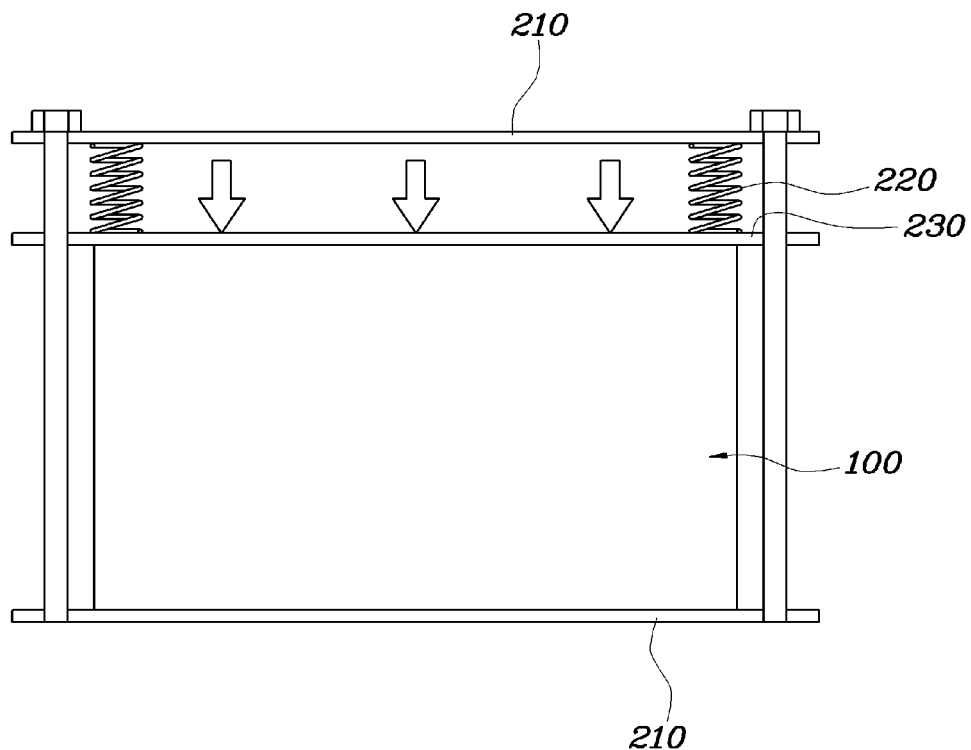
FIG. 2B is a perspective view illustrating an apparatus for manufacturing a heat exchanger for a vehicle according to an embodiment of the present invention.

FIG. 2B is a perspective view illustrating an apparatus for manufacturing a heat exchanger for a vehicle according to an embodiment of the present invention, where the apparatus may include: a fixing portion 210 for supporting top and bottom ends of a cooling panel module 100; and at least one pair of elastic portions 220 that are provided between a top end or a bottom end of the cooling panel module 100 and the fixing portion 210, and are arranged symmetrically based on a top surface or a bottom surface of the cooling panel module 100 to compress the cooling panel module 100.

In more detail, FIG. 2A is a perspective view illustrating a cooling panel module including a plurality of cooling panels according to an embodiment of the present invention, the cooling panel module 100 is configured by stacking upward/downward a plurality of cooling panels 110 in which each cooling panel 110 is provided with a flow passage portion 113 inside of which a flow passage is formed, a separation plate 111 covering the top and bottom of the flow passage portion 113, and a frame 112 which surrounds the edge of the flow passage portion 113 in which both ends of the cooling panel 110 are opened to form an inlet and outlet.

Further, a plurality of cooling panels 110 are arranged to form a cooling panel module 100. In particular, when the cooling panels 110 are stacked, the inlet and outlet on the cooling panels may be disposed differently from those of adjacent cooling panels, for example, in a cooling panel 110 arranged as the top one of a pair of cooling panels 110 adjacent to each other, coolant flowing out of a fuel cell flows in and out, and in another cooling panel 110 disposed on the bottom thereof, coolant passed through a radiator flows in and out while passing across through the radiator without being mixed with each other, thereby cooling the coolant flowed out of the fuel cell.

The fixing portion 210 is provided as a pair of panels, and is coupled to a top or bottom of the cooling panel module 100 with a bolt or a connection member, and a top or bottom end of the cooling panel module 100 is in contact with the fixing portion 210 to be supported and the other end of the cooling panel module 100 is compressed by the elastic portion 220, and thus the cooling panel module 100 is compressed vertically, as shown in FIG. 2B.

Meanwhile, a diffusion panel 230 may be further provided between the elastic portion 220 and a top or bottom surface of the cooling panel module 100 so as to diffuse a load of the elastic portion 220 while being in contact with the top or bottom surface of the cooling panel module 100, and applies even pressure to the cooling panel module 100 by the elastic portion 220. The diffusion panel 230 may prevent load concentration which may occur when the elastic portion 220 is in contact with the top or bottom surface of the cooling panel module 100, and eccentric load application caused therefrom to the cooling panel module 100, thereby applying an even load to entire top or bottom surface of the cooling panel module 100.

The elastic portion 220 and the diffusion panel 230 may be selectively provided on a top or bottom surface of the cooling panel module 100 and further be provided on both the top and bottom surfaces of the cooling panel module 100 to compress it vertically.

Further, the elastic portions 220 are arranged symmetrically as a pair on a top or bottom surface of the cooling panel module based on a central point of the top or bottom surface of the cooling panel module 100, and two or more pairs of the elastic portions may preferably be provided to be symmetrical to front/rear or left/right of the cooling panel module 100. Of course, the number of the elastic portion 220 is not limited thereto. Also, the elastic portion may be a spring but is not limited thereto.

Figure 3:
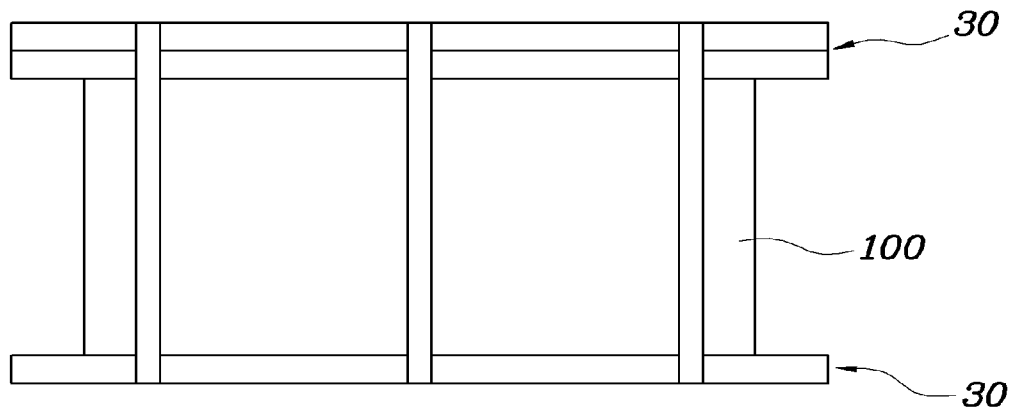
FIG. 3 (RELATED ART) is a perspective view illustrating an apparatus for manufacturing a heat exchanger for a vehicle according to the related art.

Meanwhile, according to the related art, the weight panels 30 have been provided on top and bottom ends of the cooling panel module 100 so as to compress vertically the cooling panel module 100, as shown in FIG. 3. However, a number of the weight panels 30 need to be arranged when using the conventional weight panels 30, and further heat is not sufficiently applied to the cooling panel module 100 since the weight panel 30 absorbs high heat when a brazing step is performed. Further, since the metal fillers disposed on the respective bonding portions for welding the cooling panel module 100 are melted at different points, the weight panel 30 is inclined toward the firstly melted portion and loads are concentrated on a specific location, and thus, it is impossible to form even melting portion.

On the contrary, according to the present invention, an even load is always applied to a top or bottom surface of the cooling panel module 100, regardless of the difference in the melting point of the metal fillers, by arranging symmetrically the elastic portions 220 supported through the fixing portion 210 without using a number of the weight panels 30. Further, the cooling panel module 100 can be heated more smoothly when brazing is performed as compared to the related art, since only the diffusion panel 230 is in contact with the cooling panel module 100.

Figure 4:
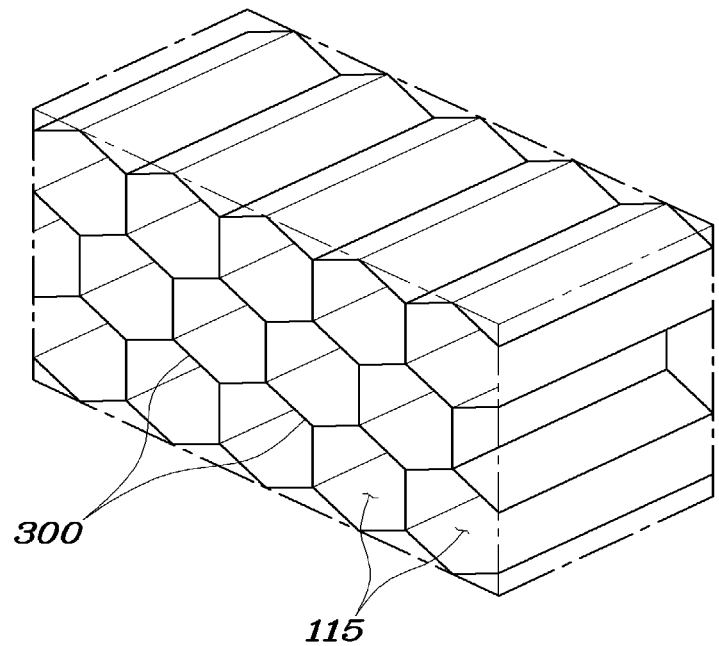
FIG. 4 is a perspective view illustrating a support pin of an apparatus for manufacturing a heat exchanger for a vehicle according to an embodiment of the present invention.

Meanwhile, as described above, the cooling panel 110 is provided with an inlet through which the coolant is input and an outlet though which the coolant is discharged, and the apparatus for manufacturing a heat exchanger for a vehicle may further include a support pin 300 for supporting the cooling panel 110 by being inserted into at least one of the inlet 115 and the outlet of the cooling panel 110 so as to prevent deformation of the inlet and the outlet when the cooling panel module 100 is compressed, as shown in FIG. 4. Preferably, the support pin 300 may be provided on both the inlet 115 and outlet, respectively. In FIG. 4, it is shown that the support pin 300 is provided on the inlet 115.

Figure 5:
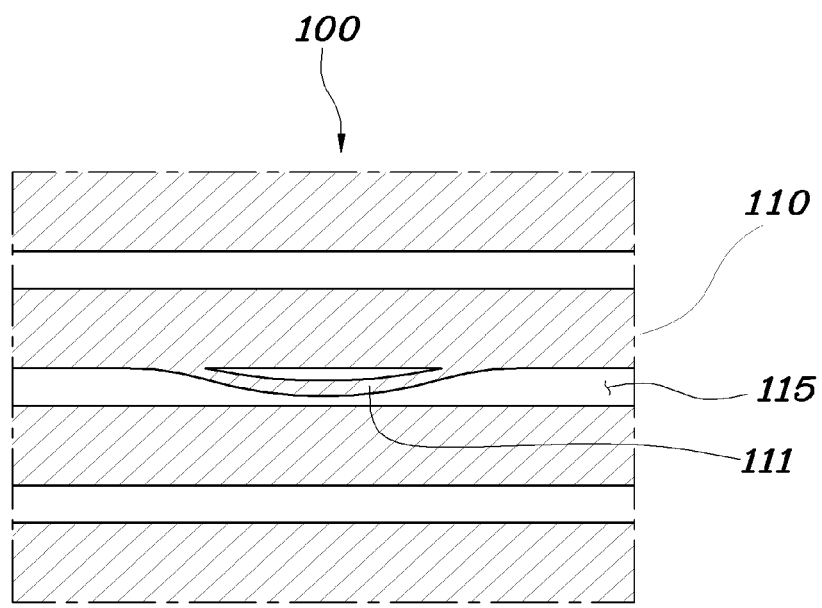
FIG. 5 is a perspective view illustrating separation plates peeled-off in an apparatus for manufacturing a heat exchanger for a vehicle according to an embodiment of the present invention.

The cooling panel 110 is configured such that the separation plates 111 are bonded to a top and bottom of the flow passage portion 113 in the center, and the frame 112 surrounds the edge of the flow passage portion 113 wherein an inlet 115 and an outlet are formed. Accordingly, according to the related art, a separate support means is not provided on the inlet 115 and the outlet of the cooling panel 110 in addition to the frame 112, and thus the part corresponding to the inlet 115 and the outlet of the cooling panel 110 of the separation plate 111 of the cooling panel 110 is peeled off due to an expansion of the metal filler when brazing the cooling panel 110, as shown in FIG. 5.

Accordingly, the support pin 300 is arranged on the ends of the inlet 115 and the outlet, thereby preventing the peeling off of the separation plate 111, and improving productivity and durability of the heat exchanger.

The support pin 300 may be shaped variously, however it may preferably be shaped as a honey comb as shown in FIG. 4. In particular, the support pin 300 is configured to provide a plurality of through-holes formed with matrixes like a honey comb, and may be inserted into at least one of the inlet 115 and the outlet of the cooling panel 110 so that the liquid can flow through the inlet 115 and the outlet. That is, the support pin may be formed such that the shape of a honey comb is shown from the front of the inlet 115 or the outlet.

The peeling off of the separation plate 111 can be effectively prevented by supporting the edges of the inlet 115 and the outlet while ensuring fluidity of the inlet 115 and the outlet through the honey comb configuration of the support pin.

Figure 6:
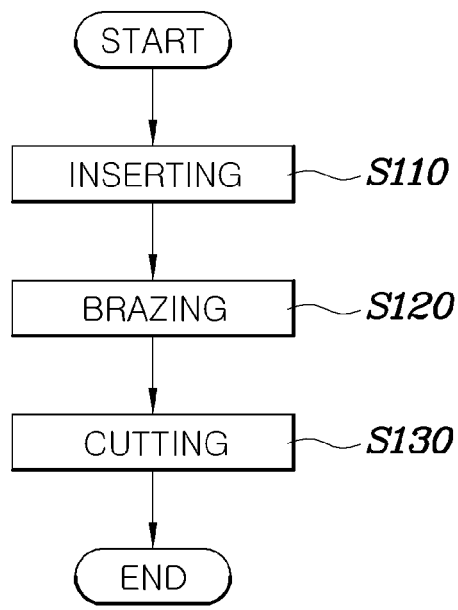
FIG. 6 is a flowchart illustrating a method of manufacturing a heat exchanger for a vehicle according to an embodiment of the present invention.

Meanwhile, according a method for manufacturing a heat exchanger for a vehicle as depicted in FIG. 6, a flowchart illustrates a method that may include the steps of: inserting a support pin 300 into at least one of the inlet 115 and the outlet of the cooling panel 110 (S110); brazing a cooling panel module 100 where the support pin 300 is inserted into at least one of the inlet 115 and the outlet of the cooling panel 110 (S120); and cutting the end of at least one of the inlet 115 and the outlet of the cooling panel 110 (S130).

In particular, the cooling panel 110 may include at least one cooling panel 110 or the cooling panel module 100.

Further, the brazing at step S120 may be performed in a vacuum state. That is, all apparatus for manufacturing a heat exchanger according to the present invention at brazing step S120 are set to be brazed in a vacuum state, wherein the vacuum-brazing has been well known, and thus the detailed description thereof is omitted.

According to the present invention the brazing is performed in a vacuum state and thus the bonding deterioration of the cooling panel 110 due to a generation of an oxidation film thereof can be prevented. Further, even though the flux that has been used in a conventional art is not used, the existing welding quality can be maintained, and further, the process and cost incurred from using the flux and the process and cost incurred from removing the flux can be eliminated, thereby improving productivity and prominently reducing the cost.

Figure 7:
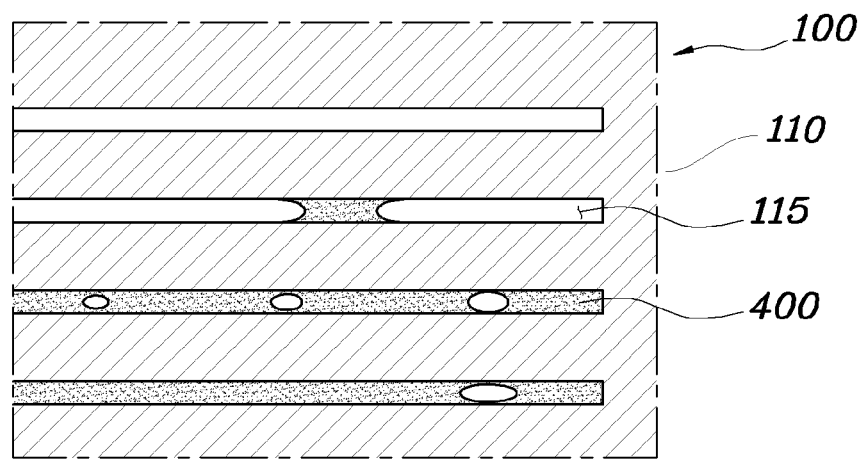
FIG. 7 is a perspective view illustrating an inlet and an outlet of a cooling panel, which are blocked with a scrap, according to an embodiment of the present invention.
Figure 8:
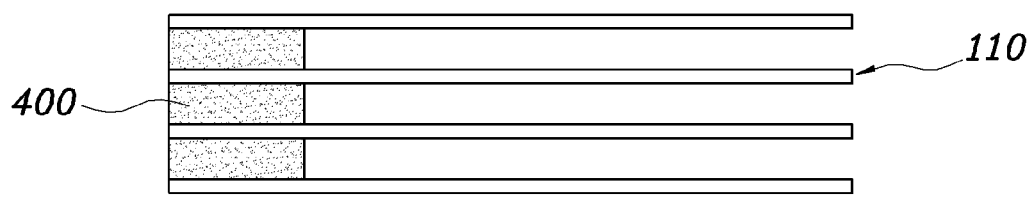
FIG. 8 is a view illustrating a cooling panel a part of which blocked with a scrap is to be cut according to a method for manufacturing a heat exchanger for a vehicle of an embodiment of the present invention.

Meanwhile, when the brazing is performed, the metal filler used for bonding is introduced into the inlet 115 and the outlet of the cooling panel 110 to be hardened when it is cooled, thereby forming a scrap 400 at the inlet and the outlet and blocking the inlet 115 and the outlet therethrough, as shown in FIG. 7. Here, the part to be cut at the cutting step may include the scrap 400, that is, as shown in FIG. 8, the part blocked through the scrap 400 of the inlet 115 and the outlet of the cooling panel 110 is cut thereby to form finally cleaned ends of the inlet 115 and the outlet. The cutting step S130 may be formed selectively through only one of the inlet 115 and the outlet, but it may preferably be performed through both the inlet and the outlet.

According to an apparatus for manufacturing a heat exchanger for a vehicle and a method thereof as configured above, a uniform load can be applied to a top or bottom surface of the elastic panel module due to the elastic portion 220 that is symmetrically arranged and thus the dent of the elastic panel module caused from eccentric load application can be prevented.

Further, the support pin 300 is inserted into the inlet 115 and the outlet of the elastic panel and thus a fraction defective can be reduced when manufacturing the cooling panel by preventing the peeling off of the separation plate 111.

Meanwhile, the elastic panel can be bonded using a vacuum-brazing method without using flux to prevent deterioration of quality.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method for manufacturing a heat exchanger for a vehicle, comprising:

providing a plurality of cooling panels bonded to each other by pressing a cooling panel module where the plurality of cooling panels are stacked vertically, wherein each cooling panel is provided with an inlet through which coolant is input and an outlet through which the coolant is discharged;

inserting a support pin into at least one of the inlet and the outlet of the cooling panel;

brazing the cooling panel module where the support pin is inserted into at least one of the inlet and the outlet of the cooling panel; and cutting an end of at least one of the inlet and the outlet of the cooling panel;

wherein the end to be cut at the cutting step includes a scrap that is formed at the brazing step to prevent the inlet and the outlet from being blocked by the scrap.

2. The method for manufacturing a heat exchanger for a vehicle of claim 1, wherein the brazing that is performed at the brazing step is a vacuum-brazing.

* * * * *